A. A. FIRESTONE.
SPRING TIRE FOR VEHICLES.
APPLICATION FILED AUG. 12, 1915.
1,228,010.
Patented May 29, 1917.
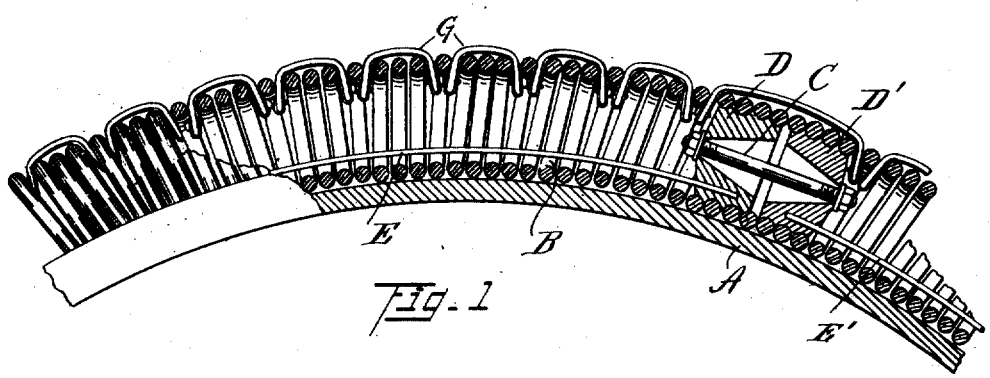
Fig. 1
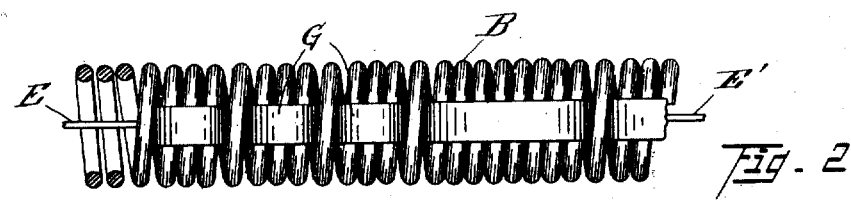
Fig. 2
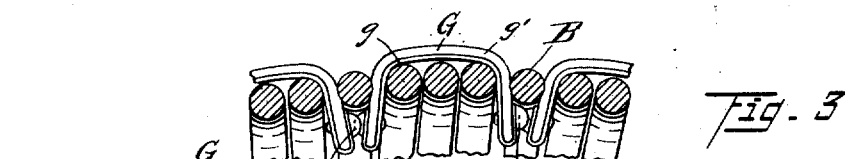
Fig. 3
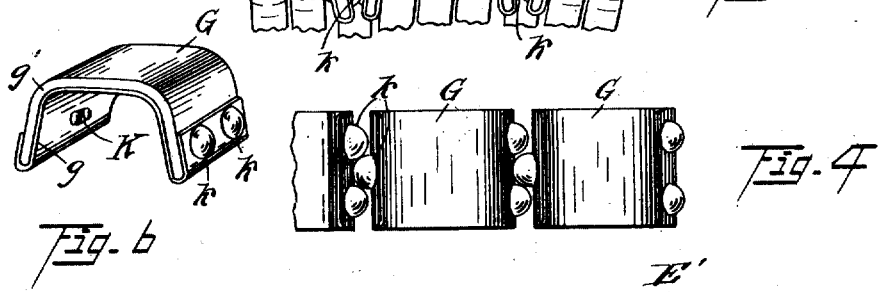
Fig. 4
Fig. 6
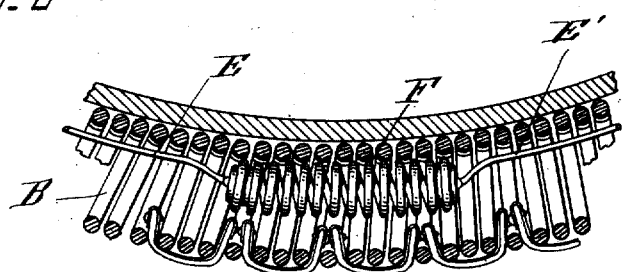
Fig. 5
Inventor
Adrian A. Firestone
by Thurston & Mois
Attorneys

UNITED STATES PATENT OFFICE.

ADRIAN A. FIRESTONE, OF CLEVELAND, OHIO.

SPRING-TIRE FOR VEHICLES.

1,228,010.     Specification of Letters Patent.     Patented May 29, 1917.

Application filed August 12, 1915. Serial No. 45,119.

*To all whom it may concern:*

Be it known that I, ADRIAN A. FIRESTONE, a citizen of the United States, residing at Cleveland, in the county of Cuyahoga and State of Ohio, have invented a certain new and useful Improvement in Spring-Tires for Vehicles, of which the following is a full, clear, and exact description.

The object of this invention is to provide a practical spring-cushion tire for vehicle wheels, especially suited for use upon commercial motor driven vehicles. Such tires do not require a great degree of resilience; their chief advantage being their relative small cost and freedom from the troubles incident to the use of rubber tires, whether pneumatic or cushion.

The invention consists in the construction and combination of parts shown in the drawing and hereinafter described and pointed out definitely in the appended claims.

In the drawings, Figure 1 is a side view partly sectioned of the upper part of a wheel rim and tire thereon; Fig. 2 is a plan view of said tire; Fig. 3 is an enlarged section through the outer portion of several of the coils; Fig. 4 is a plan view of several of the tread plates showing their relation to one another; Fig. 5 is a sectional side view of the bottom part of said tire and wheel rim, and Fig. 6 is a perspective view of one of the tread plates employed in the construction of said tire.

In the drawings, A represents the wheel rim which should have a transversely concave groove in its periphery. B represents a coiled spring annulus which fits in said concave groove. To form this annulus the ends of a spring coil are connected together by means of connectors D D', which are preferably cast into the ends of said spring, and a bolt C which goes through both connectors and fastens them together. In order to help hold the coiled spring annulus on the wheel rim I employ a two-part wire E E'. An end of each wire is connected to the end of a coiled spring F. The other end of each wire is anchored to one of the connectors D D'. These wires E E' and the intermediate coiled spring F are put into the main spring coil before the connectors are cast into the same. Then the other free ends of the wires E E' are brought close to the ends of the main coil, the coil spring F being necessarily stretched as this is done. Then when the connectors are cast into the ends of the main spring coil the metal will flow around the ends of these wires so that when this metal sets these wires will be firmly anchored to the connectors. It is also apparent that if the two wires E E' are as they should be of substantially the same length, the coil spring F will be diametrically opposite to the connectors, and will serve in a large degree to counterbalance them.

G represents tread members. These are substantially U-shaped. Each consists of an inner metallic member g, and an outer facing g' of leather or some other suitable material. A single stud K is extended through one leg of each of these tread plates about midway between its ends, and there secured so that it will project inward, and it has a head k which projects outward. In the other leg of this same tread piece two of these studs K are secured, so as to project inward, and each has the externally projecting head k. These several plates are then secured to the tire substantially as shown; that is to say, each tread plate is made to embrace a plurality (the drawing shows three) of the coils of the spring annulus; and the legs of said tread piece project down into the hollow center of said spring annulus. The next adjacent tread plate also embraces several coils of the wire, but a coil is left between each pair of tread plates, outside of the embrace thereof. When the tread plates have been put on in the manner described, the studs K projecting inward will engage beneath the adjacent embraced coils; while the heads k will go beneath and engage the unembraced adjacent coils. The single head on one tread plate will project between the two heads on the adjacent leg of the next tread plate. This interlocking of the heads of the studs prevents the tread plates from individually moving away from the tops of the coils and around toward the rim, because by so interlocking these tread plates, such movement of one can not take place unless all similarly move. Such concurrent movement of all is practically impossible. These tread plates so applied take most of the wear incident to use. They may be easily replaced when worn out; they cost little, and they may be easily applied when it is necessary to replace a worn tread plate.

The leather facing of these tread plates makes the tire less noisy in going over pavements, and it also helps hold the tread plates in place because in a very short time the pressure of the coils between which these legs will go will cause the intermediate unembraced coil to make a shallow groove in this facing, which groove is self fitted to the surface of said unembraced intermediate coil.

Having described my invention, I claim:

1. A vehicle tire which includes a coil spring having connectors cast into its ends, and a bolt which goes through said connectors to fasten them together and thereby produce a coil spring annulus, and two wires within said annulus, which wires are permanently anchored to said connectors, and a stretched coil spring within said annulus and connected at its ends with said wires.

2. A tire for vehicle wheels which includes a coil spring annulus, and a plurality of U-shaped tread plates applied to the outer periphery of said annulus—each tread plate having its legs passed inward between coils, and being of such size that it embraces a plurality of coils, and the several tread plates being applied so as to leave one unembraced coil between adjacent tread plates,—and studs which pass through and are secured to the legs of said tread plates and project in both directions therefrom beneath the coils between which the said legs are passed.

3. A tire for vehicle wheels which includes a coil spring annulus, and a plurality of U-shaped tread plates applied to the outer periphery of said annulus—each tread plate having its legs passed inward between coils, and being of such size that it embraces a plurality of coils, and the several tread plates being applied so as to leave one unembraced coil between adjacent tread plates,—and studs which pass through and are secured to the legs of said tread plates and project in both directions therefrom beneath the coils between which the said legs are passed, one leg of each tread plate carrying two separated studs, and one leg carrying a centrally placed stud which extends between the two studs on the adjacent leg of the adjacent tread plate.

4. A tire for vehicle wheels which includes a coil spring annulus, and a plurality of U-shaped tread plates applied to the outer periphery of said annulus—each tread plate having its legs passed inward between coils, and being of such size that it embraces a plurality of coils, and the several tread plates being applied so as to leave one unembraced coil between adjacent tread plates,—and studs which pass through and are secured to the legs of said tread plates and project in both directions therefrom beneath the coils between which the said legs are passed, each of said tread plates having an inner metal member and an outer facing of softer material.

In testimony whereof, I hereunto affix my signature in the presence of two witnesses.

ADRIAN A. FIRESTONE.

Witnesses:
E. L. THURSTON,
L. I. PORTER.

Copies of this patent may be obtained for five cents each, by addressing the "Commissioner of Patents, Washington, D. C."